Aug. 18, 1931.  N. C. SMITH ET AL  1,819,925
PLOW
Filed May 28, 1930  2 Sheets-Sheet 1
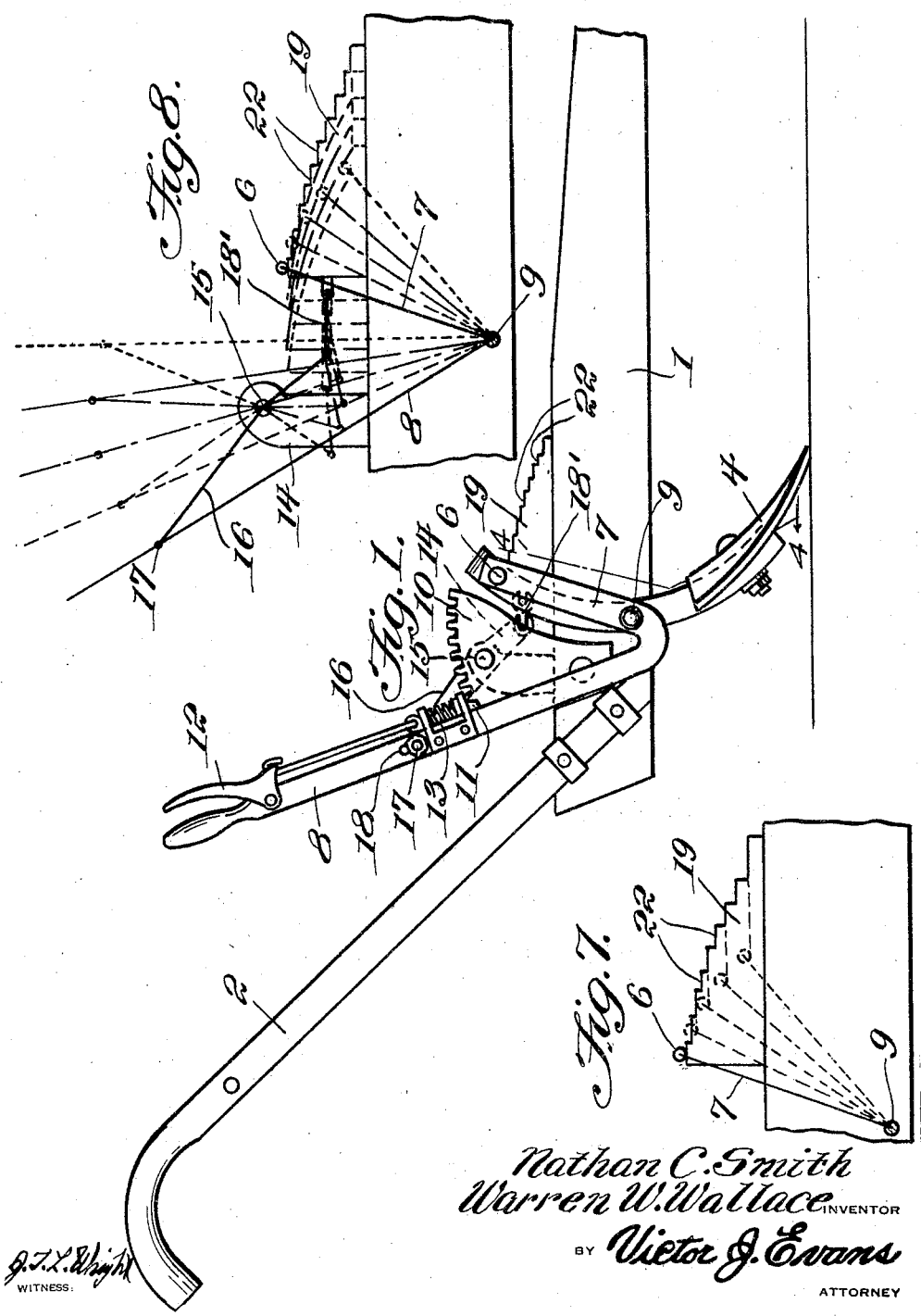

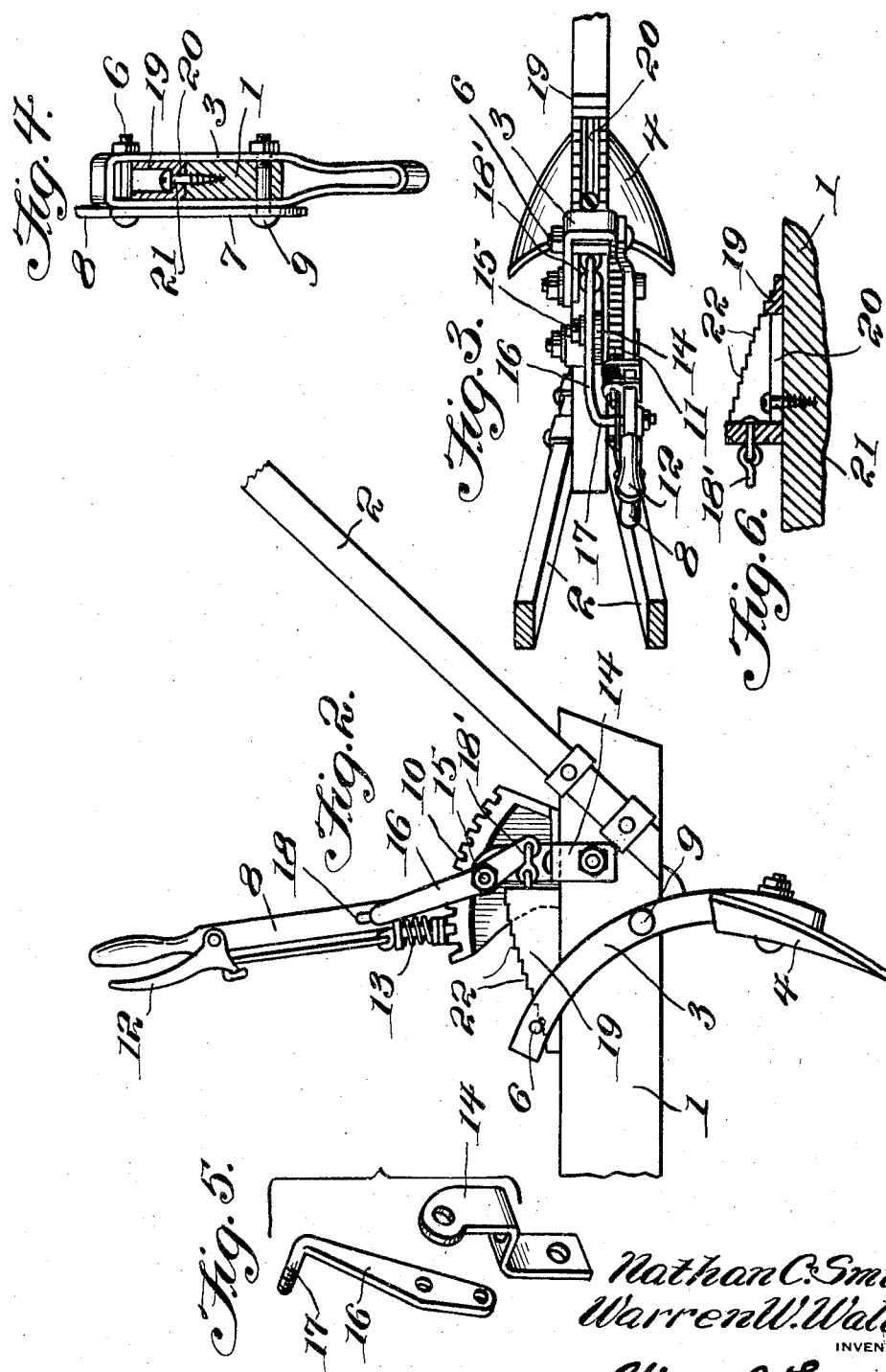

Patented Aug. 18, 1931

1,819,925

UNITED STATES PATENT OFFICE

NATHAN C. SMITH AND WARREN W. WALLACE, OF CULLMAN, ALABAMA

PLOW

Application filed May 28, 1930. Serial No. 456,633.

Our present invention has reference to an attachment for plows, and our object is the provision of an attachment and novel construction to be applied to any style or make of single shovel plows whereby the shovel or share is readily adjusted to vary the inclination thereof and thereby regulate the depth it shall run in the ground.

A further object is the provision of an attachment for this purpose in which strain is relieved from the plow shank or standard and the means which swing the same to regulate the plow share or shovel.

A further object is the provision of an attachment for this purpose in which the shank or standard is in the nature of a yoke that is pivotally secured to the beam and carries a transverse pin or the like to rest on teeth in the arcuate upper face of a wedge member which is slidable on the ground, together with means for simultaneously imparting a swinging movement to the shank and a longitudinal movement to the wedge for easily, quickly and accurately regulating the position of the shovel or share with respect to the beam and consequently the depth at which the shovel or share will enter the ground and strain between the parts is directed entirely to the pin and to the wedge.

To the attainment of the foregoing the invention consists in the improvement hereinafter described and definitely claimed.

In the drawings:

Figure 1 is a side elevation of the improvement.

Figure 2 is a similar view but looking toward the reverse side thereof.

Figure 3 is a top plan view of the improvement.

Figure 4 is a sectional view approximately on the line 4—4 of Figure 1.

Figure 5 is a perspective view of the rocker arm and supporting bracket therefor.

Figure 6 is a substantially central longitudinal sectional view through the wedge supported on the beam.

Figure 7 is a diagrammatic view to illustrate the various angles assumed by the pin of the yoke-like shank or standard with respect to the teeth of the slidable block.

Figure 8 is a similar view to illustrate the various positions assumed by the slidable block, the throw arms therefor and the operating lever.

A plow beam, in the drawings, is indicated by the numeral 1 and the handles by the numeral 2.

In carrying out our invention we make use of a yoke-shaped shank or standard 3 which straddles the beam 1. The upper portion of the shank is wider than the lower portion thereof and the lower portion of the shank has fixed thereto the shovel 4. The upper portion of the shank extends a suitable distance above the top of the beam 1 and there is passed through the parallel arms of the said upper portion of the shank a pivot pin 6. The pivot pin 6 secures to one side of the shank the angle and reinforcing end 7 of a throw lever 8. The angle arm 7 of the lever has passed therethrough a pivot 9 which passes transversely through the arms of the yoke 3 and likewise through the beam 1.

There is fixed on the beam 1, to the rear of the shank 3 an upstanding segmental yoke 10. This yoke has its teeth engaged by a spring influenced dog 11 that is operated by a suitable handle 12 which is pivoted to the handle end of the lever 8. As disclosed by the drawings the dog passes through a bearing bracket and has a lug adjacent its lower end or rather adjacent to the lower end of the bracket against which the helical spring 13 bears so that the toothed end of the dog is forced between the teeth of the segmental rack 10.

Fixedly secured to the side of the beam 1, opposite that upon which the lever 8 and its angle end 7 are arranged there is a bracket 14. Pivotally secured to this bracket, as at 15, there is an angle rocker or throw arm 16. The outer end of the rocker or throw arm 16 has an angle extension 17 which passes through a somewhat elongated slot 18 in the lever 8. The extension is threaded and has screwed thereon a suitable nut. The lower end of the rocker arm has loosely connected thereto a link 18', the said link in turn being loosely connected to the rear and elevated end of a longitudinally movable wedge member 19. The wedge member has a central depression therethrough whose lower wall is provided with a longitudinal slot 20 and through this slot there is passed the shanks of one or more headed elements 21, the said elements being threaded and screwed into the upper face of the beam 1. The upper face of the wedge is arched downwardly from its upper to its outer end and is provided with steps or teeth 22 to be engaged by the pin 6 in accordance with the rocking of the lever 16, the consequent swinging of the shank 3 and the longitudinal movement imparted by the throw lever to the wedge. By this simple arrangement it will be apparent that the mount or shank for the plow or shovel may be swung to different desired angles on the vehicle to bring the shovel toward or away from the plow beam and thereby regulate the depth the shovel is to enter the ground. It will be further apparent that the strain is directed between the pin and the wedge block and both of these elements are made of hardened material. It will be still further apparent that the device is of an extremely simple construction, and which may be attached to any ordinary plow beam and that the same overcomes the time and labor required in adjusting the plow shares or shovels or beams in the ordinary manner.

We believe the foregoing description when read in connection with the accompanying drawings will fully set forth the advantages of the construction and the simplicity thereof to those skilled in the art to which such invention relates so that further description will not be required. Obviously we do not wish to be restricted to the precise details herein set forth and, therefore, hold ourselves entitled to make such changes therefrom as fairly fall within the scope of what we claim.

Having described the invention, we claim:

1. A device for angularly swinging and sustaining a plow point on a plow beam, comprising a yoke-like shank for the shovel surrounding a plow beam and pivotally secured thereto, a slidable wedge member having an upper arched and stepped face movable beneath the yoke-shaped shank, lever operated means for swinging the shank and means actuated by the turning of the lever for imparting a longitudinal movement to the wedge to cause the steps thereof to engage with the yoke-shaped shank and means for rocking the lever when thus swung.

2. A means for adjusting and holding a plow point with respect to a plow beam, comprising a yoke-shaped shank for a plow point which surrounds the beam, a lever having an angle end which is pivoted to the shank and beam, a pin connecting the angle end of the lever to the upper end of the shank, a wedge block guided for longitudinal movement on the upper edge of the beam and having an arched face which is stepped to receive the pin thereon, a segmental rack fixed on the beam, a hand operated spring influenced pawl carried by the lever to engage with the segmental rack, a bracket on the beam, a throw arm pivoted to the bracket and having a link connection with the elevated end of the wedge and having its second end offset and received through an elongated opening in the lever.

In testimony whereof we affix our signatures.

NATHAN C. SMITH.
WARREN W. WALLACE.